(12) United States Patent
Waseda

(10) Patent No.: US 11,217,819 B2
(45) Date of Patent: Jan. 4, 2022

(54) ALL-SOLID-STATE BATTERY

(71) Applicant: Toyota Jidosha Kabushiki Kaisha, Toyota (JP)

(72) Inventor: Tetsuya Waseda, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 16/292,730

(22) Filed: Mar. 5, 2019

(65) Prior Publication Data
US 2019/0280329 A1    Sep. 12, 2019

(30) Foreign Application Priority Data
Mar. 6, 2018 (JP) .............................. JP2018-039594

(51) Int. Cl.
*H01M 10/0562* (2010.01)
*H01M 10/0525* (2010.01)
(Continued)

(52) U.S. Cl.
CPC ....... *H01M 10/0562* (2013.01); *H01M 4/386* (2013.01); *H01M 10/0525* (2013.01);
(Continued)

(58) Field of Classification Search
CPC ......... H01M 10/0562; H01M 10/0525; H01M 10/0565; H01M 10/0585; H01M 4/386; H01M 2004/027; H01M 2004/028; H01M 2300/0065; H01M 2/0257; H01M 2/08; H01M 2/0267; H01M 2/0277; H01M 2/02
(Continued)

(56) References Cited

U.S. PATENT DOCUMENTS

2013/0323568 A1* 12/2013 Tanaka ................ H01M 50/183
429/130
2014/0141299 A1*  5/2014 Yoshino ............... H01M 50/10
429/82
(Continued)

FOREIGN PATENT DOCUMENTS

JP    2000106154 A    4/2000
JP    2004193006 A    7/2004
(Continued)

OTHER PUBLICATIONS

U.S. Appl. No. 16/185,153, filed Nov. 9, 2018.

*Primary Examiner* — Milton I Cano
*Assistant Examiner* — Suphia Quraishi
(74) *Attorney, Agent, or Firm* — Dinsmore & Shohl LLP

(57) ABSTRACT

An all-solid-state battery includes an all-solid-state battery laminate including at least one all-solid-state unit cell in which a positive electrode current collector layer, a positive electrode active material layer, a solid electrolyte layer, a negative electrode active material layer, and a negative electrode current collector layer are laminated in this order, and a resin layer covering a side surface of the all-solid-state battery laminate, wherein the resin layer has a multi-layer structure including a first resin layer and a second resin layer in this order from the side in the vicinity of the side surface of the all-solid-state battery laminate, and wherein the elastic modulus of the first resin layer is lower than the elastic modulus of the second resin layer.

7 Claims, 3 Drawing Sheets

(51) Int. Cl.
*H01M 10/0585* (2010.01)
*H01M 4/38* (2006.01)
*H01M 10/0565* (2010.01)
*H01M 4/02* (2006.01)

(52) U.S. Cl.
CPC ... *H01M 10/0565* (2013.01); *H01M 10/0585* (2013.01); *H01M 2004/027* (2013.01); *H01M 2004/028* (2013.01); *H01M 2300/0065* (2013.01)

(58) Field of Classification Search
USPC .......................................................... 429/97
See application file for complete search history.

(56) References Cited

U.S. PATENT DOCUMENTS

| | | | | |
|---|---|---|---|---|
| 2014/0234695 A1* | 8/2014 | Kondo | ................ | H01M 10/054 429/162 |
| 2015/0236373 A1* | 8/2015 | Ohtomo | ............ | H01M 10/0562 264/104 |
| 2017/0352923 A1* | 12/2017 | Iwano | .................... | H01M 50/10 |
| 2017/0373300 A1* | 12/2017 | Maeda | ................. | H01M 4/525 |
| 2018/0013102 A1* | 1/2018 | Iizuka | ................. | H01M 50/124 |
| 2018/0090766 A1* | 3/2018 | Ohsawa | .............. | H01M 10/052 |

FOREIGN PATENT DOCUMENTS

| | | | | |
|---|---|---|---|---|
| JP | 2017220447 A | 12/2017 | | |
| WO | WO-2016152565 A1 * | 9/2016 | .......... | H01M 2/1653 |
| WO | WO-2016158754 A1 * | 10/2016 | .............. | H01M 6/48 |

* cited by examiner

ALL-SOLID-STATE BATTERY

CROSS REFERENCE TO RELATED APPLICATIONS

The present application claims priority to Japanese Patent Application No. 2018-039594 filed on Mar. 6, 2018, the entire contents of which are hereby incorporated by reference.

FIELD

The present disclosure relates to an all-solid-state battery. In particular, the present disclosure relates to an all-solid-state battery comprising an all-solid-state battery laminate and a resin layer which covers the all-solid-state battery laminate.

BACKGROUND

In recent years, various technologies for sealing batteries using resin have been proposed.

For example, Patent Literature 1 discloses a technology in which an all-solid-state battery element is covered with an exterior body composed of a thermosetting resin or a thermoplastic resin. Furthermore, Patent Literature 2 discloses a technology in which the side surface of electrode current collectors, which are laminated so as to interpose a gel electrolyte therein, are coated with a resin. Further, Patent Literature 3 discloses a technology in which a liquid resin is supplied only to the side surface of an all-solid-state laminate battery and the resin is thereafter cured.

CITATION LIST

Patent Literature

[Patent Literature 1] Japanese Unexamined Patent Publication (Kokai) No. 2000-106154
[Patent Literature 2] Japanese Unexamined Patent Publication (Kokai) No. 2004-193006
[Patent Literature 3] Japanese Unexamined Patent Publication (Kokai) No. 2017-220447

SUMMARY

In all-solid-state batteries in which an all-solid-state battery laminate is covered with a resin layer, when changes in volume of the all-solid-state battery laminate occur during charging or discharging, cracks may form in the resin layer covering the all-solid-state battery laminate.

Thus, the present disclosure has been made in view of the above circumstances and aims to provide an all-solid-state battery in which cracking of the resin layer due to changes in volume of the all-solid-state battery laminate can be prevented.

The inventors of the present disclosure have discovered that the above problem can be solved by the following means.

<Aspect 1>
An all-solid-state battery, comprising:
an all-solid-state battery laminate including at least one all-solid-state unit cell in which a positive electrode current collector layer, a positive electrode active material layer, a solid electrolyte layer, a negative electrode active material layer, and a negative electrode current collector layer in this order, and
a resin layer covering a side surface of the all-solid-state battery laminate,
wherein the resin layer has a multi-layer structure including a first resin layer and a second resin layer in this order from the side in the vicinity of the side surface of the all-solid-state battery laminate, and
wherein the elastic modulus of the first resin layer is lower than the elastic modulus of the second resin layer.
<Aspect 2>
The all-solid-state battery according to aspect 1, wherein the negative electrode active material layer comprises an alloy-based negative electrode active material.
<Aspect 3>
The all-solid-state battery according to aspect 2, wherein the alloy-based negative electrode active material comprises a Si alloy-based negative electrode active material.
<Aspect 4>
The all-solid-state battery according to any one of aspects 1 to 3, wherein the material of the resin layer is a thermosetting resin or a thermoplastic resin.
<Aspect 5>
The all-solid-state battery according to any one of aspects 1 to 4, wherein the all-solid-state battery laminate is restrained in the lamination direction.
<Aspect 6>
The all-solid-state battery according to aspect 5, wherein the restraining pressure of the restraining is 1.0 MPa or more.
<Aspect 7>
The all-solid-state battery according to any one of aspects 1 to 6, wherein the all-solid-state battery is an all-solid-state lithium ion secondary battery.

According to the present disclosure, in an all-solid-state battery in which a side surface of an all-solid-state battery laminate is covered by a resin layer, cracking of the resin layer due to changes in volume of the all-solid-state battery laminate can be prevented.

DESCRIPTION OF EMBODIMENTS

Figure 1:
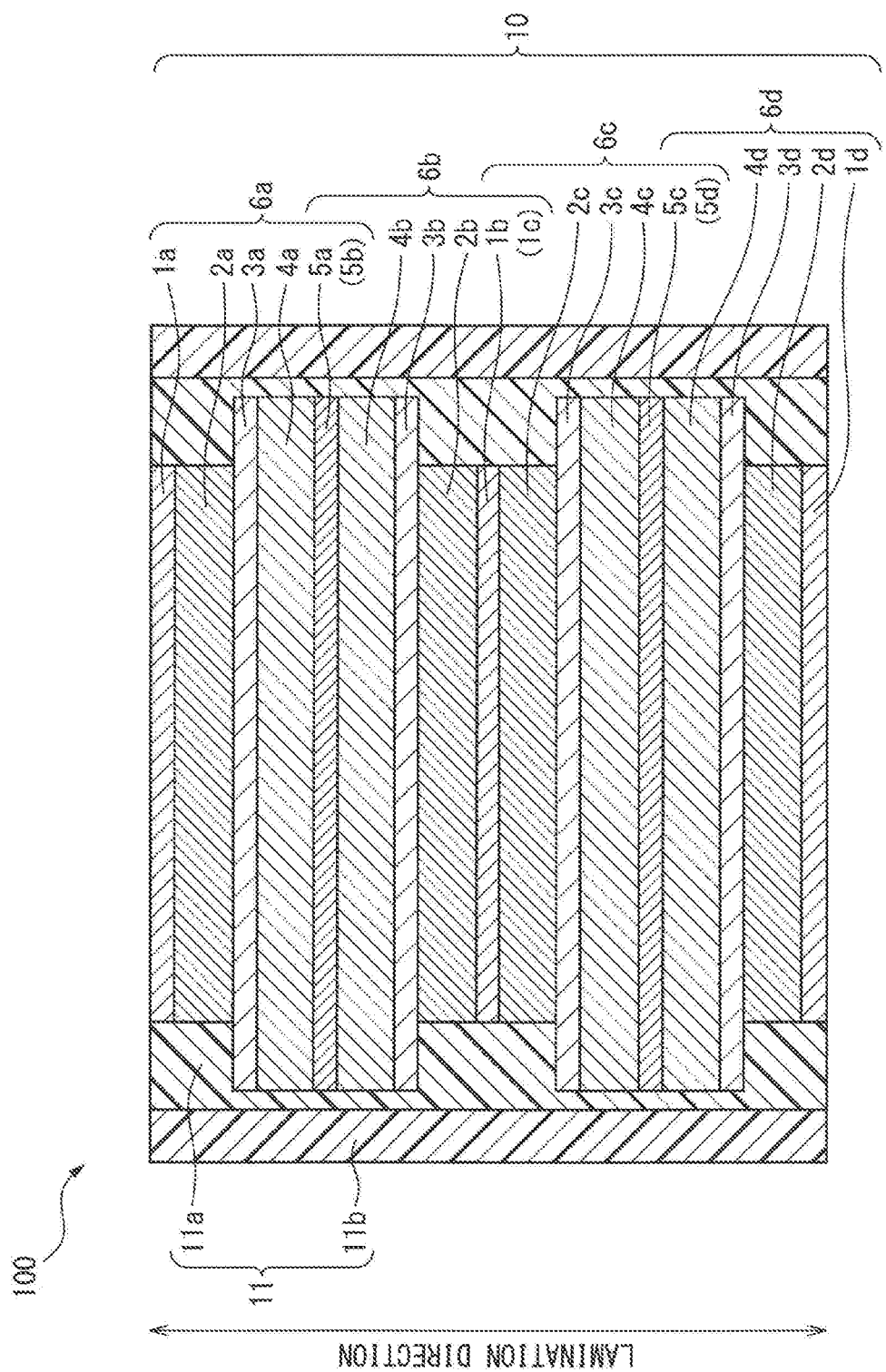
FIG. 1 is a schematic cross-sectional view showing an example of the all-solid-state battery of the present disclosure.

The embodiments for carrying out the present disclosure will be explained in detail below with reference to the drawings. Note that, for the convenience of explanation, the same or corresponding components in the drawings are assigned the same reference numerals and redundant explanations therefor have been omitted. Not all of the constituent elements of the embodiments are necessarily indispensable, and some constituent elements may be omitted in some cases. The embodiments shown in the drawings below are examples of the present disclosure, but present disclosure is not limited thereby.

<<All-Solid-State Battery>>

The all-solid-state battery of the present disclosure comprises:
an all-solid-state battery laminate including at least one all-solid-state unit cell in which a positive electrode current collector layer, a positive electrode active material layer, a solid electrolyte layer, a negative electrode active material layer, and a negative electrode current collector layer are laminated in this order, and a resin layer covering a side surface of the all-solid-state battery laminate, wherein the resin layer has a multi-layer structure including a first resin layer and a second resin layer in this order from the side in the vicinity of the side surface of the all-solid-state battery laminate, and wherein the elastic modulus of the first resin layer is lower than the elastic modulus of the second resin layer.

FIG. 1 is a schematic cross-sectional view showing an example of the all-solid-state battery of the present disclosure. The all-solid-state battery 100 of the present disclosure comprises an all-solid-state battery laminate 10 and a resin layer 11. The resin layer 11 covers the side surface of the all-solid-state battery laminate 10. Furthermore, the rein layer 11 has a multi-layer structure including a first resin layer 11a and a second resin layer 11b in this order from the side in the vicinity of the side surface of the all-solid-state battery laminate 10. The elastic modulus of the first resin layer 11a is lower than the elastic modulus of the second resin layer 11b.

Figure 2:
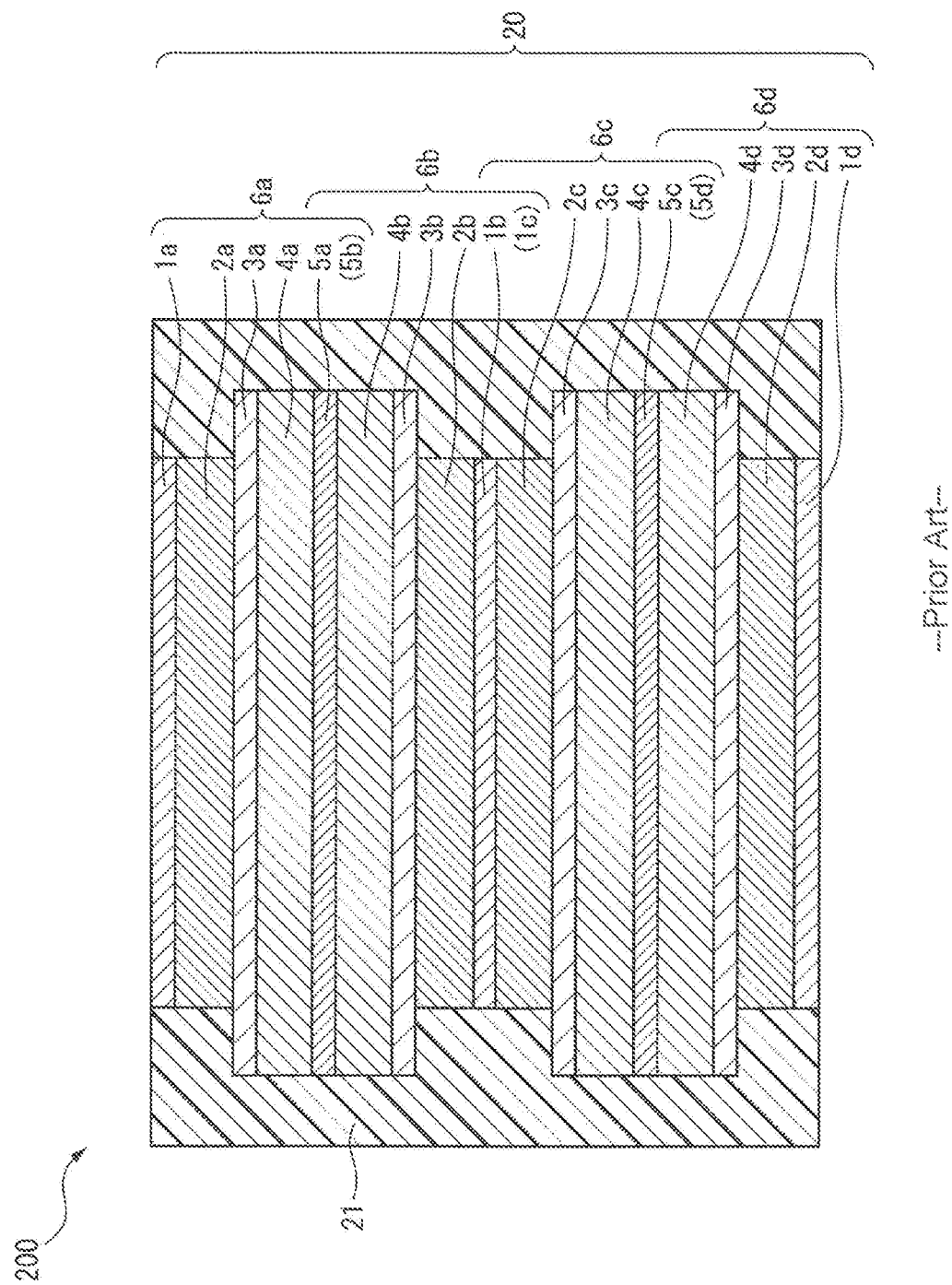
FIG. 2 is a schematic cross-sectional view showing an example of a conventional all-solid-state battery.

In conventional all-solid-state batteries, which are covered with a resin layer as described above, when the all-solid-state battery laminate and the resin layer are in close contact, there is a risk that the resin layer, which is in close contact with the all-solid-state battery laminate, will become deformed, whereby cracks may form in the resin layer due to changes in the volume of the all-solid-state battery laminate. For example, in the conventional all-solid-state battery 200 shown in FIG. 2, the all-solid-state battery laminate 20 and the resin layer 21 are in close contact. In this case, the active material layer, specifically an alloy-based negative electrode active material layer, expands and contracts largely due to charging and discharging. As a result, there is a risk that cracks may form in the resin layer 21.

In order to reduce the risk of cracking, the use of a highly flexible resin layer has been considered. However, highly flexible resin layers may not sufficiently protect the all-solid-state battery laminate.

The present disclosure provides an all-solid-state battery comprising a resin layer in which the balance between flexibility and rigidity is considered, and which can solve the above problems. In other words, in the all-solid-state battery of the present disclosure, the resin layer which covers the side surface of the all-solid-state battery laminate has a multi-layer structure including a first resin layer and a second resin layer in this order from the side in the vicinity of the side surface of the all-solid-state battery laminate, and the elastic modulus of the first resin layer is lower than the elastic modulus of the second resin layer. By covering the side surface of the all-solid-state battery laminate using a resin layer having such a multi-layer structure and using, in the multi-layer structure, a resin layer having a relatively low elastic modulus as the resin layer directly contacting the side surface of the all-solid-state battery laminate, even if the volume of the all-solid-state battery laminate increases and decreases rapidly due to charging and discharging, the resin layer having a lower elastic modulus (the resin layer directly contacting the side surface of the all-solid-state battery laminate, i.e., the first resin layer) can absorb the stresses generated by the changes in volume of the all-solid-state battery laminate. As a result, cracking of the resin layer can be prevented. Furthermore, since the elastic modulus of the second resin layer is relatively high, it is considered that protection of all-solid-state battery laminate can be achieved.

<Resin Layer>

In the present disclosure, the resin layer has a multi-layer structure including a first resin layer and a second resin layer in this order from the side in the vicinity of the side surface of the all-solid-state battery laminate. The elastic modulus of the first resin layer is lower than the elastic modulus of the second resin layer.

In the present disclosure, the elastic modulus may be represented by, for example, the Young's modulus. Furthermore, the Young's modulus can generally be obtained by a plurality of measurement methods, but in the present disclosure, a mechanical testing method such as a tensile test is used. Specifically, the Young's modulus as the elastic modulus may be a value measured at a tensile rate of 200 mm/min under an environment of 23° C. and 50% humidity in accordance with JIS K7161:2014.

As described above, the all-solid-state battery of the present disclosure is characterized in that the elastic modulus of the first resin layer is lower than the elastic modulus of the second resin layer. In other words, under the same measurement conditions (for example, measurement method, measurement device, measurement temperature, measurement humidity, and measurement speed), and using test samples in the same state, with the measured elastic modulus values, the elastic modulus of the first resin layer need only be lower than the elastic modulus of the second resin layer. Furthermore, the first resin layer and second resin layer, having such a relationship, can be formed by appropriately selecting resin materials having different elastic modulus. For example, a resin material the elastic modulus of which is relatively low can be used as the first resin material and a resin material the elastic modulus of which is relatively high can be used as the second resin material.

In the present disclosure, the difference between the elastic modulus of the first resin layer and the elastic modulus of the second resin layer is not particularly limited. For example, using the elastic modulus of the second resin layer as a reference (100%), the elastic modulus of the first resin layer may be 95% or less, 90% or less, 85% or less, 80% or less, 75% or less, 70% or less, 65% or less, 60% or less, 55% or less, 50% or less, 40% or less, 30% or less, 20% or less, or 10% or less. Furthermore, the elastic modulus of the first resin layer may be 5% or more, 10% or more, 15% or more, 20% or more, 25% or more, 30% or more, 40% or more, 50% or more, 60% or more, 70% or more, 80% or more, or 90% or more.

In the present disclosure, the material of the resin layer (the material of the first resin layer and the material of the second resin layer) is not particularly limited. Any insulating resin material which is conventionally used in all-solid-state batteries may be used.

For example, the material of the resin layer may be a curable resin or a thermoplastic resin. Furthermore, the curable resin may be a thermosetting resin, a photocurable resin (for example, a UV-curing resin) or an electron beam-curable resin. More specifically, the material of the resin layer may be, for example, an epoxy resin, an acrylic resin, a polyimide resin, a polyester resin, a polypropylene resin, a polyamide resin, a polystyrene resin, a polyvinyl chloride resin, or a polycarbonate resin. However, the material of the resin layer is not limited thereto.

In the present disclosure, the resin layer covers the side surface of the all-solid-state battery laminate. As a result, the outer surface of the all-solid-state battery of the present disclosure may not include an outer casing such as a laminate film or a metal can. Thus, the all-solid-state battery of the present disclosure is more compact than conventional all-solid-state batteries, in which an outer casing is necessary, and thereby results in an improvement in the energy density of the battery. However, an embodiment of the present disclosure may further include an outer casing.

For example, as in the all-solid-state battery 100 shown in FIG. 1, the upper end surface and the lower end surface in the lamination direction are the positive electrode current collector layers 1*a* and 1*d*, and only the side surface of the all-solid-state battery laminate 10 is covered by the resin layer 11 having a multi-layer structure. Depending on the lamination order of the all-solid-state battery laminate, the upper end surface and the lower end surface in the lamination direction may not be limited to positive electrode current collector layers but may be negative electrode current collector layers.

Furthermore, the all-solid-state battery of the present disclosure may be an all-solid-state battery in which the upper end surface and the lower end surface in the lamination direction of the all-solid-state battery laminate are covered by films or the like and the side surface of at least the all-solid-state battery laminate is covered by the resin layer. Moreover, the all-solid-state battery of the present disclosure may be an all-solid-state battery in which the upper end surface and/or the lower end surface in the lamination direction of the all-solid-state battery laminate is covered by the resin layer.

<All-Solid-State Battery Laminate>

In the present disclosure, the all-solid-state battery laminate can include one or more all-solid-state unit cells. For example, in FIG. 1, the all-solid-state battery laminate 10 of the present disclosure includes the all-solid-state unit cells 6*a*, 6*b*, 6*c*, and 6*d*. Furthermore, in the present disclosure, the all-solid-state unit cell is obtained by laminating a positive electrode current collector layer, a positive electrode active material layer, a solid electrolyte layer, a negative electrode active material layer, and a negative electrode current collector layer in this order.

In the all-solid-state battery of the present disclosure, the all-solid-state battery laminate may be restrained in the lamination direction.

Figure 3:
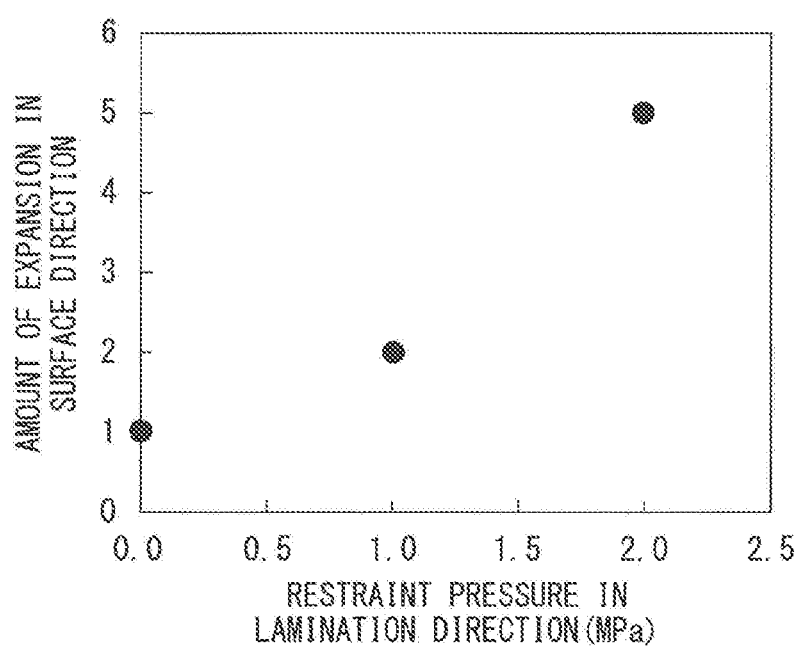
FIG. 3 is a view showing the relationship between the restraint pressure applied in the lamination direction of the all-solid-state battery laminate and the amount of expansion in the surface direction.

When the all-solid-state battery laminate is charged or discharged while being restrained in the lamination direction, the relationship between the restraint pressure (MPa) in the lamination direction and the amount of expansion of the negative electrode active material layer in the surface direction (the direction perpendicular to the lamination direction) is shown in FIG. 3. Specifically, given that, when the restraint pressure in the lamination direction of the all-solid-state battery laminate is 0 MPa, i.e., when the all-solid-state battery laminate is not substantially restrained, if the rate of expansion of the negative electrode active material layer in the surface direction when charging and discharging is the baseline (1); the expansion rate of the negative electrode active material layer in the surface direction is the two fold that when not be restrained, when charging and discharging with the restraint pressure being set to 1.0 MPa, and the expansion rate in the surface direction of the negative electrode active material layer is multiplied five times that when not be restrained, when charging and discharging with the restraint pressure being set to 2.0 MPa. Namely, it is suggested that as the restraint pressure in the lamination direction with respect to the all-solid-state battery laminate increases, the amount of expansion of the negative electrode active material layer in the surface direction increases during charging and discharging. Note that, the relationship shown in FIG. 3 was obtained by measurement using a Si alloy-based negative electrode active material layer.

In contrast to the results of FIG. 3, in the all-solid-state battery of the present disclosure, the side surface of the all-solid-state battery laminate is covered with the resin layer having the specific multi-layer structure described above, and the all-solid-state battery laminate is restrained in the lamination direction, whereby even if the expansion amount of the negative active material layer is large in the surface direction, the resin layer can absorb the stresses caused by the change in volume of the all-solid-state battery laminate and cracking of the resin layer can be prevented. In other words, when the all-solid-state battery laminate is restrained in the lamination direction, the effect of the present disclosure can be more remarkably exhibited. Furthermore, such restraint pressure is not particularly limited and may be, for example 1.0 MPa or more, 1.5 MPa or more, 2.0 MPa or more, or 2.5 MPa or more. Note that, the upper limit of the restraint pressure is not particularly limited and may be, for example, 50 MPa or less.

When the all-solid-state battery laminate of the present disclosure includes two or more all-solid-state unit cells, the two all-solid-state unit cells, which are adjacent in the lamination direction, may be of a monopolar-type sharing a positive or negative electrode current collector layer. Thus, for example, the all-solid-state battery laminate may be a laminated body of four all-solid-state unit cells sharing positive electrode current collector layers and negative electrode current collector layers.

More specifically, as shown in, for example, FIG. 1, the all-solid-state battery laminate 10 can include, in this order, a positive electrode current collector layer 1*a*, a positive electrode active material layer 2*a*, a solid electrolyte layer 3*a*, a negative electrode active material layer 4*a*, a negative electrode current collector layer 5*a* (5*b*), a negative electrode active material layer 4*b*, a solid electrolyte layer 3*b*, a positive electrode active material layer 2*b*, a positive electrode current collector layer 1*b* (1*c*), a positive electrode active material layer 2*c*, a solid electrolyte layer 3*c*, a negative electrode active material layer 4*c*, a negative electrode current collector layer 5*c* (5*d*), a negative electrode active material layer 4*d*, a solid electrolyte layer 3*d*, a positive electrode active material layer 2*d*, and a positive electrode current collector layer 1*d*.

Furthermore, when the all-solid-state battery laminate includes two or more all-solid-state unit cells, the two all-solid-state unit cells, which are adjacent in the lamination direction, may be of a bipolar-type sharing a positive/negative electrode current collector layer, which is used as both positive electrode and negative electrode current collector layers. Thus, for example, the all-solid-state battery laminate may be a laminated body of three all-solid-state unit cells sharing positive/negative electrode current collector layers, which are used as both positive and negative electrode current collector layers. Specifically, the all-solid-state battery laminate can include, in this order, a positive electrode current collector layer, a positive electrode active material layer, a solid electrolyte layer, a negative electrode active material layer, a positive/negative electrode current collector layer, a positive electrode active material layer, a solid electrolyte layer, a negative electrode active material layer, a positive/negative electrode current collector layer, a positive electrode active material layer, a solid electrolyte layer, a negative electrode active material layer, and a negative electrode current collector layer.

Furthermore, the all-solid-state battery of the present disclosure may include a positive electrode current collector tab, which is electrically connected to the positive electrode current collector layer, and a negative electrode current collector tab, which is electrically connected to the negative electrode current collector layer. In this case, these collector tabs may protrude from the resin layer. According to this configuration, the power generated by the all-solid-state battery laminate can be extracted to the outside via the collector tabs.

Furthermore, the positive electrode current collector layer may include positive current collector protruding parts which protrude in the surface direction, and these positive current collector protruding parts may be electrically connected to the positive electrode current collector tab. Likewise, the negative electrode current collector layer may include negative current collector protruding parts, which protrude in the surface direction, and these negative current collector protruding parts may be electrically connected to the negative electrode current collector tab.

Each member of the all-solid-state battery laminate will be described in detail below. In order to facilitate easy understanding of the present disclosure, each member of the all-solid-state battery laminate of all-solid-state lithium ion secondary battery will be described as an example. However, the all-solid-state battery of the present disclosure is not limited to lithium ion secondary batteries and can be widely applied.

Positive Electrode Current Collector Layer

The conductive material used in the positive electrode current collector layer is not particularly limited and any known conductive material which can be used in an all-solid-state battery can be suitably used. For example, the conductive material used in the positive electrode current collector layer may be SUS, aluminum, copper, nickel, iron, titanium, carbon, or the like. However, the conductive material is not limited thereto.

The form of the positive electrode current collector layer of the present disclosure is not particularly limited, and can be, for example, a foil, a plate, a mesh, or the like. In some embodiments, the positive electrode current collector layer may be a foil.

Positive Electrode Active Material Layer

The positive electrode active material layer includes at least a positive electrode active material, and, in some embodiments, further includes a solid electrolyte, which will be described later. In addition thereto, an additive which is used in the positive electrode active material layer of an all-solid-state battery, such as, for example, a conductive aid or a binder, can be included in accordance with the intended use or application thereof.

The material of the positive electrode active material used in the present disclosure is not particularly limited and any known material can be used. For example, the positive electrode active material may be lithium cobalt oxide ($LiCoO_2$), lithium nickel oxide ($LiNiO_2$), lithium manganate ($LiMn_2O_4$), $LiNi_{1/3}Mn_{1/3}Co_{1/3}O_2$ or a heterogeneous-element-substituted Li—Mn spinel represented by $Li_{1+x}Mn_{2-x-y}M_yO_4$ (wherein M is at least one metal element selected from Al, Mg, Co, Fe, Ni and Zn). However, the material of the positive electrode active material layer is not limited thereto.

The conductive aid is not particularly limited and any known conductive aid can be used. For example, the conductive aid may be a carbon material, such as VGCF (vapor grown carbon fiber) or carbon nanofibers, or a metal material. However, the conductive aid is not limited thereto.

The binder is not particularly limited and any known binder can be used. For example, the binder may be a material such as polyvinylidene fluoride (PVdF), carboxymethyl cellulose (CMC), butadiene rubber (BR), styrene butadiene rubber (SBR) or combinations thereof. However, the binder is not limited thereto.

Solid Electrolyte Layer

The solid electrolyte layer includes at least a solid electrolyte. The solid electrolyte is not particularly limited and any material commonly used as the solid electrolyte in all-solid-state batteries can be used. For example, the solid electrolyte may be a sulfide solid electrolyte, oxide solid electrolyte, or polymeric electrolyte. However, the solid electrolyte is not limited thereto.

As examples of the sulfide solid electrolyte, sulfide-based amorphous solid electrolytes such as $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$LiI$—$LiBr$, $Li_2S$—$P_2S_5$—$GeS_2$, $LiI$—$Li_2S$—$P_2O_5$, $LiI$—$Li_3PO_4$—$P_2S_5$, and $Li_2S$—$P_2S_5$; sulfide-based crystalline solid electrolytes such as $Li_{10}GeP_2S_{12}$, $Li_7P_3S_{11}$, $Li_3PS_4$, and $Li_{3.25}P_{0.75}S_4$; or combinations thereof can be used.

As examples of the oxide solid electrolyte, amorphous oxide solid electrolytes such as $Li_2O$—$B_2O_3$—$P_2O_3$, $Li_2O$—$SiO_2$, and $Li_2O$—$P_2O_5$; or crystalline oxide solid electrolytes such as $Li_5La_3Ta_2O_{12}$, $Li_7La_3Zr_2O_{12}$, $Li_6BaLa_2Ta_2O_{12}$, $Li_3PO_{(4-3/2w)}N_w$ (where w<1), and $Li_{3.6}Si_{0.6}P_{0.4}O_4$ can be used. However, the oxide solid electrolyte is not limited thereto.

As examples of the polymeric electrolyte, polyethylene oxide (PEO), polypropylene oxide (PPO), or copolymers thereof can be used. However, the polymeric electrolyte is not limited thereto.

The solid electrolyte may be a glass or a crystallized glass (glass ceramic). Furthermore, in addition to the above-described solid electrolytes, the solid electrolyte layer may include a binder as necessary. Specific examples thereof are the same as the "binders" described above for the "positive electrode active material layer", and thus, a description thereof has been omitted.

Negative Electrode Active Material Layer

The negative electrode active material layer includes at least a negative electrode active material and, in some embodiments, further includes a solid electrolyte as described above. In addition thereto, depending on the purpose or application thereof, for example, additives commonly used in the negative electrode active material layer of all-solid-state batteries, such as a conductive aid or binder, can be included.

The material of the negative electrode active material is not particularly limited. In some embodiments, the material is capable of occluding and releasing metal ions such as lithium ions. For example, the negative electrode active material may be an alloy-based negative electrode active material or a carbon material. However, the material of the negative electrode active material layer is not limited thereto.

Though alloy-based negative electrode active materials have a high discharge capacity, they have a large volume change (expansion and contraction) accompanying the occlusion and release of lithium ions. Thus, there is a problem that relatively large stresses are generated during volume changes. Regarding this problem, as described above, since the side surface of the all-solid-state battery laminate of the present disclosure is covered with a resin layer having the specific multi-layer structure described above, even if the volume of the alloy-based negative electrode active material changes, cracking of the resin layer can be prevented. In other words, if the negative electrode active material layer includes an alloy-based negative electrode active material, the effect of the present disclosure can be more remarkably exhibited.

The alloy-based negative electrode active material is not particularly limited, and, for example, a Si alloy-based negative electrode active material or a Sn alloy-based negative electrode active material can be used. The Si alloy-based negative electrode active material can be silicon, silicon oxide, silicon carbide, silicon nitride, or a solid solution thereof. Furthermore, the Si alloy-based negative electrode active material can include an element other than silicon, such as Fe, Co, Sb, Bi, Pb, Ni, Cu, Zn, Ge, In, Sn, or Ti. The Sn alloy-based negative electrode active material can be tin, tin oxide, tin nitride, or a solid solution thereof. Furthermore, the Sn alloy-based negative electrode active material can include an element other than tin, such as Fe, Co, Sb, Bi, Pb, Ni, Cu, Zn, Ge, In, Ti, or Si.

In some embodiments, the alloy-based negative electrode active material may be a Si alloy-based negative electrode active material.

The carbon material is not particularly limited and can be, for example, a hard carbon, a soft carbon, or graphite.

Regarding the solid electrolyte and other additives such as the conductive aid and binder used in the negative electrode active material layer, those described above in the sections "positive electrode active material layer" and "solid electrolyte layer" can be appropriately used.

Negative Electrode Current Collector Layer

The conductive material used in the negative electrode current collector layer is not particularly limited and any known conductive material which can be used in an all-solid-state battery can be suitably used. For example, the conductive material used in the negative electrode current collector layer may be SUS, aluminum, copper, nickel, iron, titanium, carbon, or the like. However, the conductive material is not limited thereto.

The form of the negative electrode current collector layer is not particularly limited, and can be, for example, a foil, a plate, a mesh, or the like. In some embodiments, the negative electrode current collector layer may be a foil.

<<All-Solid-State Battery Type>>

In the present disclosure, the type of the all-solid-state battery can be an all-solid-state lithium ion battery, an all-solid-state sodium ion battery, an all-solid-state magnesium ion battery, or an all-solid-state calcium ion battery. In some embodiments, the type of the all-solid-state battery may be an all-solid-state lithium ion battery or an all-solid-state sodium ion battery. In some other embodiments, the type of the all-solid-state battery may be an all-solid-state lithium ion battery.

Furthermore, the all-solid-state battery of the present disclosure may be a primary battery or may be a secondary battery. In some embodiments, the all-solid-state battery of the present disclosure may be a secondary battery. Secondary batteries can be repeatedly charged and discharged and can be used as, for example, in-vehicle batteries. Thus, in some embodiments the all-solid-state battery of the present disclosure may be an all-solid-state lithium ion secondary battery.

The invention claimed is:

1. An all-solid-state battery, comprising: an all-solid-state battery laminate including at least one all-solid-state unit cell in which a positive electrode current collector layer, a positive electrode active material layer, a solid electrolyte layer, a negative electrode active material layer, and a negative electrode current collector layer are laminated in this order, and a resin structure covering an entirety of side surfaces of the all-solid-state battery laminate, wherein the resin structure has a multi-layer structure including a first resin layer and a second resin layer in this order from the side in the vicinity of the side surfaces of the all-solid-state battery laminate, and wherein the elastic modulus of the first resin layer is lower than the elastic modulus of the second resin layer.

2. The all-solid-state battery according to claim 1, wherein the negative electrode active material layer comprises an alloy-based negative electrode active material.

3. The all-solid-state battery according to claim 2, wherein the alloy-based negative electrode active material comprises a Si alloy-based negative electrode active material.

4. The all-solid-state battery according to claim 1, wherein the material of the resin structure is a thermosetting resin or a thermoplastic resin.

5. The all-solid-state battery according to claim 1, wherein the all-solid-state battery laminate is restrained in a lamination direction.

6. The all-solid-state battery according to claim 5, wherein a restraining pressure of the restraining is 1.0 MPa or more.

7. The all-solid-state battery according to claim 1, wherein the all-solid-state battery is an all-solid-state lithium ion secondary battery.

* * * * *